US010912314B2

(12) United States Patent
Mandati et al.

(10) Patent No.: US 10,912,314 B2
(45) Date of Patent: Feb. 9, 2021

(54) COLORED COATED EDIBLE PRODUCT CONTAINING HIGH LEVEL OF LIQUID FLAVORS IN COATING AND METHODS OF MAKING THEREOF

(71) Applicant: INTERCONTINENTAL GREAT BRANDS LLC, East Hanover, NJ (US)

(72) Inventors: Stephanie Mireille Christiane Mandati, Munich (DE); Laurie Welborn, Pullach (DE); Jorge Beltran Lobato, Munich (DE); Gaelle Buffet, Bracknell (GB)

(73) Assignee: MONDELEZ DEUTSCHLAND R&D GMBH, Munich (DE)

( * ) Notice: Subject to any disclaimer, the term of this patent is extended or adjusted under 35 U.S.C. 154(b) by 232 days.

(21) Appl. No.: 15/320,086

(22) PCT Filed: Jun. 25, 2015

(86) PCT No.: PCT/US2015/037676
§ 371 (c)(1),
(2) Date: Dec. 19, 2016

(87) PCT Pub. No.: WO2016/003764
PCT Pub. Date: Jan. 7, 2016

(65) Prior Publication Data
US 2017/0135372 A1 May 18, 2017

Related U.S. Application Data

(60) Provisional application No. 62/018,860, filed on Jun. 30, 2014.

(51) Int. Cl.
| | |
|---|---|
| A23G 4/20 | (2006.01) |
| A23G 3/54 | (2006.01) |
| A23G 4/06 | (2006.01) |
| A23G 3/36 | (2006.01) |
| A23G 3/48 | (2006.01) |
| A23G 4/12 | (2006.01) |

(52) U.S. Cl.
CPC .............. *A23G 4/20* (2013.01); *A23G 3/368* (2013.01); *A23G 3/48* (2013.01); *A23G 3/54* (2013.01); *A23G 4/068* (2013.01); *A23G 4/126* (2013.01)

(58) Field of Classification Search
CPC .......... A23G 3/34; A23G 3/343; A23G 3/368; A23G 3/48; A23G 3/54; A23G 4/068; A23G 4/126; A23G 4/20

USPC .......................................................... 426/89
See application file for complete search history.

(56) References Cited

U.S. PATENT DOCUMENTS

| | | | |
|---|---|---|---|
| 3,492,131 A | 1/1970 | Schlatter | |
| 3,924,016 A | 12/1975 | Walters et al. | |
| 4,279,931 A | 7/1981 | Verwaerde et al. | |
| 4,619,834 A | 10/1986 | Zanno et al. | |
| 5,569,477 A | 10/1996 | Nesbitt | |
| 2003/0198713 A1* | 10/2003 | Clark ................... | A23G 3/0063 426/103 |
| 2004/0191402 A1 | 9/2004 | Stawski et al. | |
| 2006/0147580 A1 | 7/2006 | Nissen et al. | |
| 2007/0148284 A1* | 6/2007 | Jani ........................ | A23G 4/06 426/3 |
| 2007/0148292 A1 | 6/2007 | Royo et al. | |

FOREIGN PATENT DOCUMENTS

| | | | |
|---|---|---|---|
| CN | 103037703 A | 4/2013 | |
| CN | 103153081 A | 6/2013 | |
| JP | S53125784 U | 10/1978 | |
| WO | 0189313 A1 | 11/2001 | |
| WO | 2005065461 A1 | 7/2005 | |
| WO | 2006037319 A1 | 4/2006 | |
| WO | 2007100721 A2 | 9/2007 | |
| WO | 2009036954 A1 | 3/2009 | |
| WO | 2009140351 A2 | 11/2009 | |
| WO | 2009147158 | 12/2009 | |
| WO | 2011084759 A2 | 7/2011 | |
| WO | WO-2011143347 A2 * | 11/2011 | ........... A61K 9/2813 |
| WO | 2011153229 A1 | 12/2011 | |
| WO | 2014062413 A1 | 4/2014 | |

OTHER PUBLICATIONS

International Search Report for International Application No. PCT/US20151037676; International Filing Date: Jun. 25, 2015; dated Sep. 21, 2015; 7 pages.
Written Opinion of the International Searching Authority for International Application No. PCT/US2015/037676; International Filing Date: Jun. 25, 2015; dated Sep. 21, 2015; 7 pages.

* cited by examiner

*Primary Examiner* — Jyoti Chawla
(74) *Attorney, Agent, or Firm* — Cantor Colburn LLP (57) ABSTRACT

Colored hard coated edible products characterized by minimal appearance defects in the coating are disclosed. Color and flavor are in substantially separated regions of the coating. Methods of making such products are also disclosed.

24 Claims, 3 Drawing Sheets

| Amounts in coating | | |
|---|---|---|
| | Flavor | Color |
| A = | 3.33% | 0.0037% |
| B = | 3.33% | 0.0085% |
| C = | 1.00% | 0.0037% |
| D = | 1.00% | 0.0085% |

| Product Range | | Color | |
|---|---|---|---|
| | | Low | High |
| Flavor | High | A | B |
| | Low | C | D |

| Color Stability Defects (Standard coating) | | Color | |
|---|---|---|---|
| | | Low | High |
| Flavor | High | Medium | High |
| | Low | Low | Medium |

| Color Stability Defects (New coating) | | Color | |
|---|---|---|---|
| | | Low | High |
| Flavor | High | None | None |
| | Low | None | None |

FIG. 4

COLORED COATED EDIBLE PRODUCT CONTAINING HIGH LEVEL OF LIQUID FLAVORS IN COATING AND METHODS OF MAKING THEREOF

CROSS REFERENCE TO RELATED APPLICATIONS

This application is a National Stage application of PCT/US2015/037676, filed 25 Jun. 2015, which claims the benefit of U.S. Provisional Application No. 62/018,860, filed 30 Jun. 2014, both of which are incorporated by reference in their entirety herein.

BACKGROUND

This disclosure generally relates to edible products, e.g., chewing gum and confectionery products, with coatings including high levels of flavor, and methods of preparing the same.

Coatings are included on confectionery and chewing gum compositions for a variety of purposes including providing a color or texture, for providing a flavor, for protection of the core, and the like. Coatings can be prepared as smooth, uniform layers such as hard panned coatings or soft coatings.

Coated chewing gum products containing high levels of flavor in the coatings are prone to defects in appearance, which are generally unsatisfactory to consumers. In particular, when high level of flavors are in contact with colors in the coating, the color system can be unstable, frequently resulting in appearance defects on the product surface.

There remains a need in the art for new methods of preparing coated chewing gum and confectionery products with a coating containing high levels of flavor that minimizes appearance defects.

SUMMARY

Disclosed herein are hard coated edible products characterized by minimal appearance defects in the coating.

In an embodiment, the hard coated edible product comprises an edible core having a colored coating, the coating comprising about 15% to about 50% by weight of the hard coated edible product, wherein the coating color is characterized by a CIELAB L*<95, and flavorant and colorant are substantially spatially separated in the coating.

In an embodiment, the hard coated edible product comprises an edible core having a coating comprising at least two coating layers, an inner flavor layer comprising flavorant and a dried first coating syrup, the first coating syrup comprising no more than 0.0004 wt % of a colorant comprising a carotenoid, a curcuminoid, riboflavin, a derivative of any of the foregoing, or a combination of the foregoing, wherein the weight percent is by weight of the coating syrup; and an outer color layer comprising a dried second coating syrup, the outer color layer comprising a colorant comprising a carotenoid, a curcuminoid, riboflavin, a derivative of any of the foregoing, or a combination of the foregoing and no more than 0.5 wt % flavorant, wherein the weight percent is by weight of the outer color layer, the coating comprising about 15% to about 50% by weight of the hard coated edible product.

Also disclosed are methods of making the hard coated edible product.

In an embodiment, the method comprises applying a first coating syrup and flavorant to a surface of an edible core to obtain a flavored coating layer, wherein the flavored coating layer is about 10% to about 95%, by weight of the total coating on the hard coated edible product and wherein the first coating syrup comprises no more than 0.0004 wt % of a colorant comprising a carotenoid, a curcuminoid, riboflavin, a derivative of any of the foregoing, or a combination of the foregoing; and applying a second coating syrup to the flavored coating layer to obtain a colored coating layer, wherein the colored coating layer is about 5% to about 50%, by weight of the total coating on the hard coated edible product, and wherein the colored coating layer comprises a colorant comprising a carotenoid, a curcuminoid, riboflavin, a derivative of any of the foregoing, or a combination of the foregoing, and no more than 0.5 wt % of a flavorant by weight of the colored coating layer, wherein the edible core is about 50% to about 75% by weight of the hard coated edible product.

The above described and other features are exemplified by the following detailed description.

BRIEF DESCRIPTION OF THE DRAWINGS

The accompanying drawings incorporated in and forming a part of the specification.

DETAILED DESCRIPTION

Coated gum products with high levels of flavor in a conventional colored coating were found to show unacceptably high numbers of appearance defects, such as cracking and/or discoloration, immediately upon manufacture and to have low shelf stability with respect to production of such defects with aging. A method was developed to minimize such defects at manufacture in coated edible products comprising high levels of flavor and an intense color in the coating, and to maximize shelf life with respect to development of such defects with aging. To avoid this problem, color and flavors are in separated regions of the coating on the edible core. Flavor is applied in a coating syrup that contains substantially no color in the first stages of coating the edible core. Once flavor application is finished, colored coating syrup can be applied. Use of this method results in color coated edible products showing minimal discoloration and cracking at manufacture, and having a longer shelf file with respect to such defects. The method was found to produce coated gum products with reduced levels of color defects even for coatings having lower flavor and/or color amounts in the coating. The method is particularly beneficial for color systems including a colorant comprising a carotenoid, a curcuminoid, riboflavin, a derivative of any of the foregoing, or a combination of the foregoing.

Accordingly, disclosed herein are hard coated edible products characterized by minimal appearance defects in the colored coating and methods of preparing such products.

In one embodiment, the hard coated edible product comprises an edible core having a colored coating, the coating comprising about 15% to about 50% by weight of the hard coated edible product, wherein the coating color is characterized by a CIELAB L*<95, and flavorant and colorant are substantially spatially separated in the coating. The coating can comprise about 25% to about 35% by weight of the hard coated edible product. The coating color can be characterized by a CIELAB L*<90, <85, <75, <65, or <60. The coating color can be further characterized by a CIELAB a*<0, more specifically by a CIELAB a*<0 and b*>0. The coating color can be achieved by inclusion of more than one colorant in the coating layer. Substantially spatially separating flavorant and a colorant in the coating can comprise having a flavor layer with flavorant having no more than 1% of the total amount of the colorant in the entire coating, and a colored layer having no more than 1% of the total amount of flavorant in the entire coating. Substantially spatially separating flavorant and a colorant in the coating can comprise having a flavor layer with flavorant having no more than 0.0008 wt % of colorant by weight of the flavor layer, and a colored layer having no more than 0.5% flavorant by weight of the colored layer. Alternatively, substantially spatially separating flavorant and colorant in the coating can comprise the flavorant and colorant being completely spatially separated in the coating, for example in two separate layers. The colorant can comprise a carotenoid, a curcuminoid, riboflavin, a derivative of any of the foregoing, or a combination of the foregoing. In preferred embodiments, the colorant comprises a carotenoid or a derivative thereof.

In another embodiment, the hard coated edible product comprises an edible core having a coating comprising at least two coating layers, an inner flavor layer comprising flavorant and a dried first coating syrup, the first coating syrup comprising no more than 0.0004 wt % of a colorant comprising a carotenoid, a curcuminoid, riboflavin, a derivative of any of the foregoing, or a combination of the foregoing, wherein the weight percent is by weight of the coating syrup; and an outer color layer comprising a colorant comprising a carotenoid, a curcuminoid, riboflavin, a derivative of any of the foregoing, or a combination of the foregoing and no more than 0.5 wt % flavorant, wherein the weight percent is by weight of the outer coating layer, the coating comprising about 15% to about 50% by weight of the hard coated edible product. The coating can comprise about 25% to about 35% by weight of the hard coated edible product. In preferred embodiments, the colorant comprises a carotenoid or a derivative thereof. The coating color can be achieved by inclusion of more than one colorant in the coating layer, e.g., a blue colorant and a yellow colorant can be included to obtain a green coating color.

The hard coated edible product disclosed herein can further comprise a base layer coating the edible core and under the inner flavor layer. The base layer can include no flavorant and/or no colorant comprising a carotenoid, a curcuminoid, riboflavin, a derivative of any of the foregoing, or a combination of the foregoing. The base layer can be about 25% to about 65%, by weight of the total coating on the hard coated edible product. The hard coated edible product can further comprise a barrier layer over the inner flavor layer and under the outer color layer. The barrier layer can include no flavorant and/or no colorant comprising a carotenoid, a curcuminoid, riboflavin, a derivative of any of the foregoing, or a combination of the foregoing. The barrier coating layer can be about 2% to about 8%, by weight of the total coating on the hard coated edible product.

In another aspect, methods of making the hard coated edible product products are also disclosed.

In an embodiment, the method comprises applying a first coating syrup and flavorant to a surface of an edible core to obtain a flavored coating layer, wherein the flavored coating layer is about 10% to about 95%, by weight of the total coating on the hard coated edible product and wherein the first coating syrup comprises no more than 0.0004 wt % of a colorant comprising a carotenoid, a curcuminoid, riboflavin, a derivative of any of the foregoing, or a combination of the foregoing; and applying a second coating syrup to the flavored coating layer to obtain a colored coating layer, wherein the colored coating layer is about 5% to about 50%, by weight of the total coating on the hard coated edible product, and wherein the colored coating layer comprises a colorant comprising a carotenoid, a curcuminoid, riboflavin, a derivative of any of the foregoing, or a combination of the foregoing; and no more than 0.5 wt % of a flavorant by weight of the colored coating layer, wherein the edible core is about 50% to about 85% by weight of the hard coated edible product. The colored coating layer can include more than one colorant to achieve the desired coating color. The edible core can be about 65% to about 75% by weight of the hard coated edible product. The method can further comprise prior to the application of the first coating syrup and flavorant, applying a base coating syrup to the surface of the edible core to obtain a base layer, wherein the base coating syrup comprises no colorant comprising a carotenoid, a curcuminoid, riboflavin, a derivative of any of the foregoing, or a combination of the foregoing and no flavorant; wherein the base layer is about 25% to about 65%, by weight of the total coating on the hard coated edible product. The method can further comprise prior to applying the second coating syrup: applying a base coating syrup to the surface of the flavor-coated core to obtain a barrier coating layer, wherein the base coating syrup comprises no colorant comprising a carotenoid, a curcuminoid, riboflavin, a derivative of any of the foregoing, or a combination of the foregoing and no flavorant; wherein the barrier coating layer is about 2% to about 8%, by weight of the total coating on the hard coated edible product. In the method the coating color can be characterized by a CIELAB L* of <95, <85, <75, <65, or <60. The coating color can be further characterized by a CIELAB a*<0, more specifically by a CIELAB a*<0 and b*>0.

Further aspects of the hard coated edible products and methods of making such products are described below.

CIELAB

Commission internationale de l'eclairage (CIE) 1976 L*a*b* (CIELAB) is a three dimensional color space to describe all the colors visible to the human eye that was created to serve as a device-independent model to be used as a reference. The three coordinates of CIELAB represent the lightness of a color (L*=0 yields black and L*=100 indicates white), its position between red/magenta and green (a*, negative values indicate green while positive values indicate magenta) and its position between yellow and blue (b*, negative values indicate blue and positive values indicate yellow). All three values are required to completely describe the color of an object. The three coordinates of CIELAB are based on a cube root transformation of the color data. The lightness coordinate (L*) in CIELAB is calculated using the cube root of the relative luminance.

Herein, CIELAB values are relative to CIE standard illuminant D50.

Hard coated edible products disclosed herein and/or made with the methods disclosed herein can have a color characterized by L*<95, <90, <85, <75, <65, or <60. Such products have been found to benefit from separation of the flavor and color in the coating as disclosed herein. The coating color can be further characterized by a CIELAB a*<0, more specifically by a CIELAB a*<0 and b*>0.

Coating Composition

The hard coated edible products described herein include one or more coating compositions at least partially surrounding the composition in one or more layers. If desired, the coating may completely surround, coat, cover, or enclose an edible core. Alternatively, the coating may only partially surround, coat, cover, or enclose an edible core. The coating may be amorphous or crystalline.

Coating compositions, also referred to herein as coating syrups, comprise as the primary component a saccharide, a polyol, or a combination of saccharide and polyol. Coating compositions may further include any conventional ingredient such as, but not limited to, sweeteners, coating binders, flavors, colorants, sensates, functional ingredients, and food acids. The sweeteners, flavors, sensates, functional ingredients, and food acids be encapsulated, unencapsulated (or "free") or a combination of encapsulated and unencapsulated Suitable saccharides may include, but are not limited to, mono-saccharides, di-saccharides and poly-saccharides such as but not limited to, sucrose (sugar), dextrose, maltose, dextrin, xylose, ribose, glucose, mannose, galactose, sucromalt, fructose (levulose), invert sugar, corn syrups, maltodextrins, fructo oligo saccharide syrups, partially hydrolyzed starch, corn syrup solids, polydextrose, soluble fibers, insoluble fibers, and mixtures thereof.

Suitable polyols may include, but are not limited to sugar alcohols (or polyols) such as, but not limited to, sorbitol, xylitol, mannitol, galactitol, maltitol, hydrogenated isomaltulose (ISOMALT), lactitol, erythritol, hydrogenated starch hydrolysates, maltitol syrups, and mixtures thereof.

Suitable hydrogenated starch hydrolysates include those disclosed in U.S. Pat. No. 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

Flavoring agents, or flavorants, include those commonly known in the art such as essential oils, synthetic flavors, or mixtures thereof, including but are not limited to, oils derived from plants and fruits such as citrus oils, fruit essences, peppermint oil, spearmint oil, other mint oils, clove oil, oil of wintergreen, anise, and the like. Other suitable flavorants are described below in the chewing gum composition section. The flavoring agents may be added to the coating syrup in an amount such that the coating will contain from approximately 0.1% to about 15.0% flavoring agent, specifically from approximately 0.5% to about 12.0% flavoring agent, more specifically from approximately 0.8% to about 10.0% flavoring agent, and most specifically from approximately 1.0% to about 6.0% flavoring agent by weight of the coating syrup. Alternatively, liquid flavor agents can be applied onto samples separately from the coating syrup in amounts to obtain the equivalent of these coating concentrations as if flavor were in the syrup.

Coloring agents, or colorants, can be added directly to the coating syrup in a dye or lake form. The coating syrup can include more than one colorant, when necessary, in order to obtain a desired color for the coating. Suitable coloring agents include food quality dyes, including those described below in the chewing gum composition section. The colorant can comprise a carotenoid, a curcuminoid, riboflavin, a derivative of any of the foregoing, or a combination of the foregoing. A curcuminoid is a linear diarylheptanoid, such as curcumin and derivatives thereof. Carotenoids are tetraterpenoids, and include xanthophylls, such as lutein, zeaxanthin, and derivatives thereof, and carotenes, such as alpha-carotene, beta-carotene, lycopene, and derivatives thereof.

In an embodiment, the coating is initially present as a liquid syrup. The coating syrup contains from approximately 30% to about 85% by weight of the coating ingredients previously described herein, and approximately 15% to about 70% by weight of a solvent such as water. In an embodiment, the coating syrup contains from approximately 65% to about 75% by weight of the coating ingredients, and approximately 25% to about 35% by weight of a solvent such as water.

In one embodiment, the coating composition comprises a polyol. The polyol can comprise xylitol, mannitol, maltitol, hydrogenated isomaltulose (ISOMALT), erythritol, or a combination thereof.

The coating binder can include naturally occurring materials such as plant exudates, seed gums, and seaweed extracts or they can be chemically modified materials such as cellulose, starch, or natural gum derivatives. Furthermore, coating binder materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Modified natural gums include propylene glycol alginate, carboxymethyl locust bean gum, low methoxyl pectin, or a combination thereof. Modified celluloses can be included such as microcrystalline cellulose, carboxymethlcellulose (CMC), methylcellulose (MC), hydroxypropylmethylcellulose (HPMC), hydroxypropylcellulose (HPC), or a combination thereof. In an embodiment, the coating binder is gum arabic.

The dried coating on a hard coated edible product may range from about 2% to about 95%, specifically about 5% to about 70%, more specifically about 10% to about 60%, yet more specifically about 20% to about 50%, yet more specifically about 25% to about 35%, and preferably about 30% by weight of an individual hard coated edible product.

Hard Coating Process

In a generalized coating process, a coating syrup comprising saccharide and water is applied in numerous thin layers to edible cores with drying in between each application in order to form an appropriate uniform coated and finished quality surface on the final products. The hard coating syrup is sprayed onto edible cores as they pass through a coating mechanism or a coating tunnel and are tumbled and rotated therein. In addition, warm air is circulated or forced into the coating tunnel or mechanism in order to dry each of the successive coating layers on the formed products until a coating layer of the desired thickness is obtained.

Two or more different coating syrups can be used to prepare a single coated product, used in various stages of the coating process. The different coating syrups can vary by the type or amount of additional coating additive, e.g. varying colorants or flavorants. For example in the method disclosed herein, a first coating syrup containing polyol, a surfactant, a coating binder, flavorant, and water can be used at the early stages of the coating process to build up a hard layer of flavored polyol hard coating. At a latter stage of coating, a second coating syrup containing polyol, a surfactant, a coating binder, a colorant, and water can be applied to result in a colored hard polyol coating. In some embodiments, the polyol is isomalt.

Optionally, certain additional coating additives can be added during the coating process separate from the application of the coating syrups, including the addition of food acids, sensates, and the like or a combination thereof. For example, the flavorant can be added during the coating process as a separate, direct addition to the coating drum, applied temporally either consecutively or simultaneous with addition of a coating syrup, or as a component of a coating syrup, specifically as a component of a coating syrup. Similarly, the colorant can be added during the coating process as a separate, direct addition to the coating drum or as a component of a coating syrup, specifically as a component of a coating syrup.

In an embodiment, applications of an edible wax or any other glazing agents can be applied during the latter stages of the coating process. Exemplary edible wax include carnauba wax, beeswax, vegetable wax, candelilla wax, edible petroleum waxes, and the like, or a combination thereof. Glazing agents in include shellac and the like.

The coating process can be continuous or batch Commercially available coating pans and equipment can be used.

In an exemplary hard coating panning procedure with chewing gum cores, syrup is added to the gum cores at a temperature range of from about 100° F. (38° C.) to about 240° F. (116° C.). Preferably, the syrup temperature is from about 130° F. (54° C.) to about 200° F. (93° C.) throughout the coating process in order to prevent the polyol or sugar in the syrup from crystallizing. The syrup may be mixed with, sprayed upon, poured over, or added to the gum center tablets in any way known to those skilled in the art.

Once a coating of syrup is applied to the gum cores, the wet syrup is dried in an inert medium, such as air. Preferably, forced drying air contacts the wet syrup coating in a temperature range of from about 70° F. (21° C.) to about 115° F. (46° C.). The drying air possesses a relative humidity of less than about 15%. The drying air may be passed over and admixed with the syrup coated gum centers in any way commonly known in the art. Preferably, the drying air is blown over and around or through the bed of the syrup coated gum centers at a suitable flow rate for the equipment used and/or the quantities of cores being processed In general, to obtain a plurality of layers, single coats of syrup are applied, allowed to dry, and then repeating the process. The amount of solids added by each coating step depends chiefly on the concentration of the coating syrup. Any number of coats may be applied to the gum core. Preferably, no more than about 75 coats are applied to the gum cores. Typically, about 30 to about 60 coats are applied.

In any event, an amount of coating syrup sufficient to yield a coated chewing gum or other edible core containing about 2% to about 95%, about 5% to about 70%, about 10% to about 60%, about 15% to about 50% coating, by weight of the finished coated product. Preferably, the final product will contain from about 20% to about 40% coating, more preferably about 25% to about 35% coating, and most preferably about 30% by weight of the finished coated product.

In some embodiments, the concentration of flavorant is identical for all applied flavor coatings. In other embodiments, the concentration of flavorant decreases in successive applications of flavored coating syrup such that the final flavored coating layer achieved has a decreasing gradient of flavor with increasing distance from the surface of the core.

In some embodiments, the concentration of colorant in the colored coating syrup is identical for all applied color coatings. In other embodiments, the concentration of colorant in the colored coating syrup increases in successive applications of colored coating syrup such that the final colored coating layer achieved has an increasing gradient of color with increasing distance from the surface of the core.

Edible Cores

The edible cores that can be coated with the coating compositions can be from a wide variety of types as long as the core has an appropriate shape for pan coating. Exemplary edible cores include chewing gum (ball, cushion, pellet, pillow, etc.), a confectionery, a nut or nut piece, a dried fruit or dried fruit piece, and the like. Exemplary confectionery material includes a caramel, a chewy candy, a chocolate, a fondant, a fudge, a gummy, a hard candy, a licorice, a low boiled candy, a nougat, a pastille, a pressed mint, and the like, or a combination thereof.

In an embodiment, the edible core is a chewing gum.

Chewing Gum Compositions

In general the chewing gum composition of the chewing gum core comprises a gum base and a bulk sweetener or a gum base polymer and a bulk sweetener. When combined with the gum base or gum base polymer, the bulk sweetener can be in powdered form or in molten form depending upon the desired texture of the chewing gum composition.

The bulk sweetener of the chewing gum composition can be a sugar-based or sugar-free bulk sweetener, specifically sugar-free. Bulk sugar sweeteners generally include saccharides. Suitable sugar sweeteners include mono-saccharides, di-saccharides and poly-saccharides, for example, sucrose (sugar), dextrose, maltose, dextrin, xylose, ribose, glucose, mannose, galactose, fructose (levulose), lactose, invert sugar, fructo oligo saccharide syrups, partially hydrolyzed starch, corn syrup solids, such as high fructose corn syrup, or a combination thereof.

The bulk sweetener can also be a sugar-free bulk sweetener such as a sugar polyol. The sugar polyol can be erythritol, galactitol, isomalt, a hydrogenated starch hydrolyzate, lactitol, maltitol, mannitol, polyglycitol, sorbitol, xylitol, and the like, or a combination thereof. The sugar polyol can be in powdered or particulate form (either crystalline or amorphous), molten (melted) form having a low moisture content (e.g. less than 10 wt %, specifically less than 5 wt %), or in syrup form (also referred to as "solution") with water. Exemplary sugar polyol syrups include sorbitol syrup, maltitol syrup, hydrogenated starch hydrolysate syrup, polyglycitol syrup, and the like.

The amount of bulk sweetener in the chewing gum composition can be about 1 to about 85 wt % based on the total weight of the chewing gum composition, specifically about 10 to about 75 wt %, more specifically about 20 to about 70 wt %, yet more specifically about 30 to about 65 wt %, and yet more specifically about 40 to about 60 wt %.

In an embodiment, the chewing gum composition is sugar-free.

The chewing gum may further comprise an additional ingredient wherein the additional ingredient is a flavorant, a fat, a high intensity sweetener, a food acid or salt thereof, a sensate, a flavor modulator or potentiator, a coloring agent, a humectant, a salt, a softener, or a combination thereof.

The chewing gum composition may optionally further comprise a humectant. Exemplary humectants include glycerin, propylene glycol, polyethylene glycol, or a combination thereof. The amount of humectant can be controlled to ensure the final chewing gum product does not unduly absorb moisture from the surrounding environment during production, packaging, storage, and use.

The chewing gum composition may further include a softener, such as those described herein for use in the gum base.

The chewing gum composition comprises a chewing gum base or a gum base polymer. In an embodiment, the chewing gum comprises a gum base comprising an elastomer and optionally an additional gum base ingredient, wherein the additional gum base ingredient is a resin, a fat, an emulsifier, a wax, a filler, a softener, a plasticizer, an antioxidant, or a combination thereof.

As used herein, the term "gum base" refers to water insoluble material(s) and can include, for example, elastomers, resins, waxes, elastomer solvents, emulsifiers, plasticizers, bulking agents/fillers, or a combination thereof.

The amount of gum base employed will vary depending upon various factors such as the type of base used, the consistency of the chewing gum desired, and the other components used in the composition to make the final chewing gum product. In general, the gum base will be present in amounts of about 5 to about 65 wt % based on the total weight of the chewing gum composition, specifically about 10 to about 55 wt %, more specifically about 15 to about 45 wt %, and yet more specifically about 20 to about 35 wt %.

Exemplary elastomers to be used in the chewing gum base include both natural and synthetic elastomers and rubbers, for example, substances of vegetable origin such as chicle, crown gum, nispero, rosadinha, jelutong, perillo, niger gutta, tunu, balata, gutta-percha, lechi-capsi, sorva, gutta kay, and the like, or a combination thereof. Synthetic elastomers such as butadiene-styrene copolymers, polyisobutylene, isobutyleneisoprene copolymers, polyethylene, a combination thereof, and the like, or a combination thereof are also useful. The gum base can include a non-toxic vinyl polymer, such as polyvinyl acetate and its partial hydrolysate, polyvinyl alcohol, or a combination thereof. When utilized, the molecular weight of the vinyl polymer can range from about 3,000 up to and including about 94,000. Additional useful polymers include: crosslinked polyvinyl pyrrolidone, polymethylmethacrylate; copolymers of lactic acid, polyhydroxyalkanoates, plasticized ethylcellulose, polyvinyl acetatephthalate, or a combination thereof.

Conventional additives can be included in the gum base in effective amounts such as plasticizers or softeners to provide a variety of desirable textures and consistency properties. Suitable plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerin, or a combination thereof. Some of these ingredients may be added at the time of gum base formation or added later during the production of the chewing gum composition.

Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, and the like, or a combination thereof, can also be incorporated into the gum base to obtain a variety of desirable textures and consistency properties.

When a wax is present in the gum base, it softens the polymeric elastomer mixture and improves the elasticity of the gum base. The waxes employed may have a melting point below about 60° C., and specifically between about 45° C. and about 55° C. The low melting wax can be a paraffin wax. The wax can be present in the gum base in an amount of about 0.1 to about 10 wt %, and specifically about 3 to about 7 wt % based on the total weight of the gum base.

In addition to the low melting point waxes, waxes having a higher melting point can be used in the gum base in amounts up to about 5 wt % based on the total weight of the gum base. Such high melting waxes include beeswax, vegetable wax, candelilla wax, carnuba wax, most petroleum waxes, and the like, or a combination thereof.

The gum base can optionally contain conventional elastomer solvents to aid in softening the elastomer base component, for example resins such as polymers of alpha-pinene or beta-pinene; methyl, glycerol or pentaerythritol esters of rosins or modified rosins and gums, such as hydrogenated, dimerized or polymerized rosins, or a combination thereof; the pentaerythritol ester of partially hydrogenated wood or gum rosin; the pentaerythritol ester of wood or gum rosin; the glycerol ester of wood rosin; the glycerol ester of partially dimerized wood or gum rosin; the glycerol ester of polymerized wood or gum rosin; the glycerol ester of tall oil rosin; the glycerol ester of wood or gum rosin; the partially hydrogenated wood or gum rosin; the partially hydrogenated methyl ester of wood or rosin; and the like; or a combination thereof. The elastomer solvent can be used in amounts of about 5 to about 75 wt % base on the total weight of the gum base, and specifically about 45 to about 70 wt %.

The gum base can include effective amounts of bulking agents such as mineral adjuvants, which can serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, or a combination thereof. These fillers or adjuvants can be used in the gum base in various amounts. Specifically the amount of filler, when used, can be present in an amount of greater than about 5 to about 60 wt % based on the total weight of the gum base, and more specifically from about 20 to about 30 wt %.

Suitable emulsifiers for use in the gum base include distilled monoglycerides, acetic acid esters of mono and diglycerides, citric acid esters of mono and diglycerides, lactic acid esters of mono and diglycerides, mono and diglycerides, polyglycerol esters of fatty acids, ceteareth-20, polyglycerol polyricinoleate, propylene glycol esters of fatty acids, polyglyceryl laurate, glyceryl cocoate, gum arabic, acacia gum, sorbitan monostearates, sorbitan tristearates, sorbitan monolaurate, sorbitan monooleate, sodium stearoyl lactylates, calcium stearoyl lactylates, diacetyl tartaric acid esters of mono- and diglycerides, glyceryl tricaprylate-caprate/medium chain triglycerides, glyceryl dioleate, glyceryl oleate, glyceryl lacto esters of fatty acids, glyceryl lacto palmitate, glyceryl stearate, glyceryl laurate, glycerly dilaurate, glyceryl monoricinoleate, triglyceryl monostearate, hexaglyceryl distearate, decaglyceryl monostearate, decaglyceryl dipalmitate, decaglyceryl monooleate, polyglyceryl 10 hexaoleate, medium chain triglycerides, caprylic/capric triglyceride, propylene glycol monostearate, polysorbate 20, polysorbate 40, polysorbate 60, polysorbate 80, polysorbate 65, hexylglyceryl distearate, triglyceryl monostearate, tweens, spans, stearoyl lactylates, calcium stearoyl-2-lactylate, sodium stearoyl-2-lactylate, lecithin, ammonium phosphatide, sucrose esters of fatty acids, sucroglycerides, propane-1,2-diol esters of fatty acids, or a combination thereof.

Exemplary flavorants (flavor, flavoring agent) for use in the chewing gum composition can include those artificial or natural flavors known in the art, for example synthetic flavor oils, natural flavoring aromatics and/or oils, oleoresins, extracts derived from plants, leaves, flowers, fruits, and the like, or a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, or a combination thereof.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavorant can be used in liquid or solid form. The flavorant can be used in free form or encapsulated form. When used in solid (dry) form, suitable drying means such as spray drying a flavor oil can be used. Alternatively, the flavorant can be encapsulated, absorbed onto water soluble materials by means known in the art, for example cellulose, starch, sugar, maltodextrin, gum arabic, and the like. In an embodiment, the flavorant can be used in physical forms effective to provide an initial burst of flavor or a prolonged sensation of flavor.

More than one flavorant can be used in the chewing gum composition. The amount and type of flavorant can be chosen based on the targeted release profile and flavor intensity desired. The chewing gum composition generally comprises a flavorant in an amount of about 0.001 to about 5 wt % based on the total weight of the chewing gum composition, specifically about 0.01 to about 4 wt %, yet more specifically about 0.1 to about 3 wt %, and still yet more specifically about 1.0 to about 2 wt %.

The chewing gum composition may further contain a high intensity sweetener. A "high intensity sweetener" as used herein means agents having a sweetness greater than the sweetness of sucrose. In an embodiment, a high intensity sweetener has a sweetness that is at least 100 times that of sugar (sucrose) on a per weight basis, specifically at least 500 times that of sugar on a per weight basis. In an embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Combinations comprising one or more sweeteners or one or more of the foregoing types of sweeteners can be used. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, or a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame, or a combination thereof;

water-soluble sweeteners derived from naturally occurring water-soluble sweeteners, such as steviosides and stevia derived compounds, for example, steviol glycosides such as rebaudiocides including rebaudiocide A, and the like, lo han quo and lo han quo derived compounds such as iso-mogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include, for example: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; 4,6,1',6'-tetradeoxy-sucrose, or a combination thereof;

protein based sweeteners such as thaumaoccous danielli, talin, or a combination thereof; and amino acid based sweeteners.

Furthermore, the high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, or a combination thereof.

The chewing gum composition may optionally further comprise a coloring agent. Coloring agents (colors, colorants, colorings) can be used in amounts effective to produce a desired color for the chewing gum. Suitable coloring agents include pigments, which can be incorporated in amounts up to about 6 wt % based on the total weight of the chewing gum. For example, titanium dioxide can be incorporated in amounts up to about 2 wt %, and specifically less than about 1 wt % based on the total weight of the chewing gum. Suitable coloring agents also include natural food colors and dyes suitable for food, drug, and cosmetic applications.

Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination thereof. In an embodiment, certified colors can include FD&C aluminum lakes, or a combination thereof. A full recitation of all FD& C colorants and their corresponding chemical structures may be found in the Kirk-Othmer Encyclopedia of Chemical Technology, 4th Edition, in volume 1 at pages 492-494.

Exemplary food acids or salts thereof for use in the chewing gum can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and alkali metal salts thereof (e.g., sodium citrate dihydrate), or a combination thereof. The food acid or salt thereof may be used in free form or in an encapsulated form.

The chewing gum composition can be prepared using standard techniques and equipment known in the art. Furthermore, the chewing gum composition can be prepared into chewing gum cores using standard techniques and equipment known in the art. Likewise, the confectionery can be prepared into confectionery cores using standard techniques and equipment known in the art.

The coated confectionery product generally comprises two, three, four, or more layers. A coating layer refers to a coat resulting from one or more applications of a given coating composition.

The coating may comprise approximately 10 to about 50% by weight of the finished coated product, specifically about 20 to about 40% by weight of the finished coated product, more specifically about 25 to about 35% by weight of the finished coated product, preferably about 30% by weight of the finished coated product.

The hard coated edible product can be packaged using techniques and equipment known in the art. For example packaging cartons, cups, blister trays, and the like can be used. In an embodiment is a packaged product that includes a hard coated edible product wherein the package has indicia on an outer surface that is indicative of the product contained in the package.

The features and advantages are more fully shown by the following examples which are provided for purposes of illustration, and are not to be construed as limiting the invention in any way.

EXAMPLES

Example 1

Screening Experiments to Minimize Coating Defects for High Flavor, Intense Color Coated Gum Product Prototype coated gum products with high flavor and intense color were observed to have an unacceptable level of color surface defects.

To troubleshoot the defects observed with the prototype coated gum products, three different lines of experiment were performed.

In the Track I experiments, the coating process was altered. In the standard coating process, colorant is present in the coating syrup when the flavor is sprayed onto the product. In the alternate process, flavor and color application were separated, with flavor applied first with a transparent or white base coating syrup and the intense, dark color present only in the coating syrup used to apply the outermost colored layers (30% of coating). In both sets of test products the base syrup constituted 70% of the coating. The formulations of the transparent and white base syrups are in Table 1 below.

TABLE 1

| | Sugarless Base syrups | |
|---|---|---|
| DESCRIPTION | Transparent base Syrup Amounts, [kg] | White base Syrup Amounts, [kg] |
| Polyol | 60-80 | 60-80 |
| Binder | 1-5 | 1-5 |
| TiO$_2$ | 0.00 | 0.1-1.5 |
| High intensity sweetener | 0.025-0.15 | 0.025-0.15 |
| emulsifier | 0-0.5 | 0-0.5 |
| water | q.s. | q.s. |
| Total | 100.00 | 100.00 |

In the Track II experiments, the standard coating process was followed but alternative colorants to the 1% lutein solution were tested. The alternative colorants were curcumin, copper chlorophyllin, carthamus, riboflavin, beta carotene, and a spray-dried (SD) lutein formulation. For applying the standard colored coating, a transparent base syrup as in Table 1 was used and the various color amounts included in the base syrup are shown in Table 2.

TABLE 2

Color Amounts in Colored Syrup formulations

| DESCRIPTION | Formula A Syrup Amounts, [kg] | Formula B Syrup Amounts, [kg] | Alternate Lutein Syrup Amounts, [kg] | Curcumin Syrup Amounts, [kg] | Copper Clorophyllin Syrup Amounts, [kg] |
|---|---|---|---|---|---|
| Brilliant Blue | 0.003 | 0.006 | 0.006 | 0.006 | 0.001 |
| Lutein liquid (1%) | 0.036 | 0.082 | | | |
| Lutein SD (4%) | | | 0.021 | | |
| Curcumin | | | | 0.025 | |
| Copper chlorophyllin | | | | | 0.020 |

In the Track III experiments, the standard coating process was followed, but emulsifier systems were varied. The emulsifier systems tested were an increased concentration of the standard emulsifier and an alternative emulsifier system to that in the standard coating formulation.

Table 3 summarizes the results of color defects determined for the samples in the three experimental screening tracks. The alternative coating process provided the best results with respect to fewest defects, desired finished product color, and simplest implementation for manufacture for color coatings including carotenoids, curcuminoids, or riboflavin as coloring agents.

the formulation for an exemplary sugarless base syrup. The base syrup is sprayed on the gum cores with the use of automatic coaters which rotate constantly. The syrup application is followed by a defined period of spreading and drying with air. This is repeated throughout several cycles in order to slowly build up a layer of crystals over the core. After a desired weight is reached, the flavor application is started.

During flavor application the base syrup is sprayed on the cores in the coater followed by the automatic application of liquid flavor in a number of applications (or cycles) of syrup+ flavor. Each application of syrup+ flavor is also followed by defined periods of spreading and drying with air. When the total amount of flavor is applied according to the desired recipe, a few layers of base syrup are applied to achieve about 5% of the total coating by weight until the

TABLE 3

Summary of Color Instability and Defects Observed for three Coating Tracks for All samples with high flavor, dark color

| Track | Color | Emulsifier | Unstable color? (defect level) |
|---|---|---|---|
| 1 | Lutein Transparent | Standard concentration | Stable |
| New process | Lutein White | Standard concentration | Stable |
| 2 | Curcumin | Standard concentration | Unstable (high) |
| Standard process | Lutein SD | Standard concentration | Unstable (medium) |
| | CopperClorophyllin | Standard concentration | Stable (but different color) |
| | Carthamus | Standard concentration | Stable (but different color) |
| | Beta Carotene | Standard concentration | Unstable (medium to high) |
| | Riboflavin | Standard concentration | Unstable (high) |
| 3 | Lutein std | Increased concentration | Unstable (low) |
| Standard process | Lutein std | Alternative emulsifier system | Unstable (high) |

Example 2

Coated Gum Products with High Levels of Flavor in Coating

Figure 1:
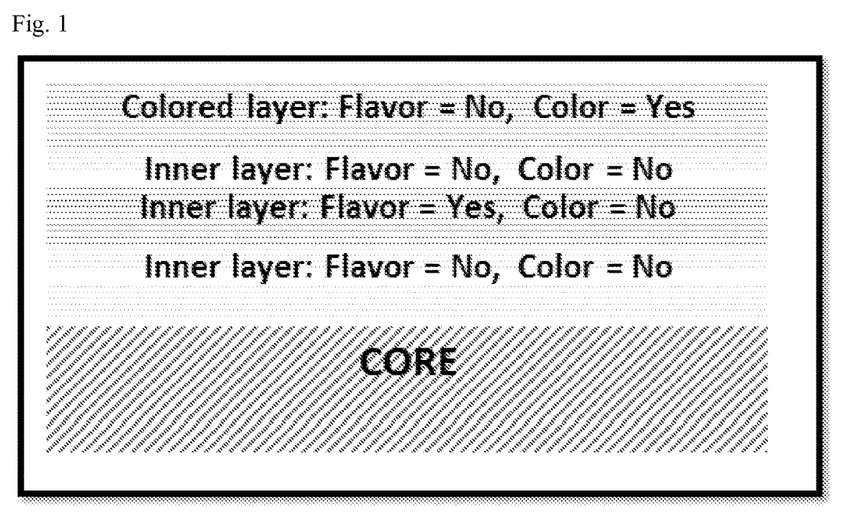
FIG. 1 is a schematic diagram showing a cross section of the four coating layers over the core in the exemplary coated chewing gum product made in Example 1.

In this example a coated gum product with a coating comprising four layers is produced. A schematic diagram illustrating the four layers over the core is shown in FIG. 1. As shown in FIG. 1, the coating layer in immediate contact with the core is a base layer with no flavor and no color, a flavor-rich coating layer is present over the base layer, a thin "barrier" layer of the base coating material is present over the flavor-rich coating layer. The outermost coating of the product comprises finishing layers including the color.

The process for making this exemplary coated gum product is as follows.

A base ("transparent") syrup is applied to the core gum to provide the innermost 70% of the coating. Table 1 provides desired coating weight (=70% of total coating applied) is reached. See FIG. 1. Using this technique, concentrations of flavor in the total coating ranging from 1% up to 10% can be readily achieved.

The dark color is applied in the last part of the coating (=30% of the total coating in the example). The percentage of colored coating as part of the total coat may vary depending on the desired final color or color concentration used.

A syrup without any color was applied during the first 70% of the coating. Flavor was applied from about 50% to 70% of the coating. Once flavor was totally applied, green syrup was used for the last 30% of the coating.

The formulation of components in the finished coating is identical, independent of whether the disclosed method of applying the coating or the standard coating method is used. An exemplary formulation of components in the finished coating is shown in Table 4 below.

TABLE 4

Coating Formulation

| DESCRIPTION | Coating Amounts, [%] |
| --- | --- |
| Polyol | 92.000-97.000 |
| Binder | 1.000-5.000 |
| Flavor Blend | 0.500-5.00 |
| Wax | 0.100-0.500 |
| Brilliant Blue | 0.002-0.050 |
| Lutein liquid | 0.02-0.50 |
| High intensity sweetener | 0.025-0.15 |
| emulsifier | 0.0-0.3 |
| Total | 100.000 |

Example 3

Effects of High or Low Levels of Flavor and Color in Coating

In this example four test products were produced to examine the effect of flavor and color amounts on level of color stability defects when applied using the standard coating process or using the new coating process in which flavor and color coating were separated. The relative levels of flavor or color in each of the four samples is summarized in FIG. 3, upper panel, and in Tables 5A-4C below.

TABLE 5A

Amounts of Flavor and Color in coating

| Test Product | Flavor* | Color* |
| --- | --- | --- |
| A= | 3.33% | 0.0037% |
| B= | 3.33% | 0.0085% |
| C= | 1.00% | 0.0037% |
| D= | 1.00% | 0.0085% |

*% expressed as a function of the total weight of the coating.

TABLE 5B

Flavor Amounts in Test Products

| Flavor Blend | In Finished Product[1] | 30% In Coating[2] | 70% In Uncolored Layer[3] | 20% In subset-Flavor Layer[4] | 70% In combined Flavor coating syrup[5] |
| --- | --- | --- | --- | --- | --- |
| FORMULAE C & D | 0.300% | 1.00% | 1.4% | 5.0% | 3.6% |
| FORMULAE A & B | 1.000% | 3.33% | 4.8% | 16.7% | 12.3% |

[1]Weight % based on total product weight.
[2]Weight % based on total coating weight (30% of product weight is coating).
[3]Weight % based on weight of uncolored coating (70% by weight of total coating is uncolored).
[4]Weight % based on weight of flavored coating (20% by weight of total coating is flavored)..
[5]Weight % based on weight of solids in combined flavor coating syrup (70% Solids in coating syrup whilst flavor addition).

TABLE 5C

Color Amounts in Test Products Assuming Actual Active Levels (i.e., Based on Ingredients Specific Potency)

| | % in Finished Product[1] | Potency | Active in Finished Product[1] | In Coating[2] | In Color Layer[3] | In Colored Coating Syrup[4] | Standard Coating Syrup[5] |
| --- | --- | --- | --- | --- | --- | --- | --- |
| FORMULA A (Medium green) | | | | | | | |
| Lutein | 0.0151% | 1% | 0.00015% | 0.00052% | 0.0017% | 0.0012% | 0.0004% |
| Brilliant Blue | 0.0011% | 85% | 0.00092% | 0.00317% | 0.0106% | 0.0074% | 0.0022% |
| Lutein + Blue | | | 0.0011% | 0.0037% | 0.0123% | 0.0086% | 0.0026% |
| Lutein + Blue (ppm) | | | 11 | 37 | 123 | 86 | 26 |
| FORMULA B (Dark green) | | | | | | | |
| Lutein | 0.0340% | 1% | 0.0003% | 0.00117% | 0.0039% | 0.0027% | 0.0008% |
| Brilliant Blue | 0.0025% | 85% | 0.0021% | 0.00729% | 0.0243% | 0.0170% | 0.0051% |
| Lutein + Blue | | | 0.0025% | 0.0085% | 0.0282% | 0.0197% | 0.0059% |
| Lutein + Blue (ppm) | | | 25 | 85 | 282 | 197 | 59 |
| FORMULA C (Medium green) | | | | | | | |
| Lutein | 0.0139% | 1% | 0.00014% | 0.0005% | 0.0018% | 0.0012% | 0.0004% |
| Brilliant Blue | 0.0010% | 85% | 0.00085% | 0.0033% | 0.0109% | 0.0076% | 0.0023% |
| Lutein + Blue | | | 0.0010% | 0.0038% | 0.0126% | 0.0088% | 0.0027% |
| Lutein + Blue (ppm) | | | 10 | 38 | 126 | 88 | 27 |

TABLE 5C-continued

Color Amounts in Test Products Assuming Actual Active Levels (i.e., Based on Ingredients Specific Potency)

| | % in Finished Product[1] | Potency | Active in Finished Product[1] | In Coating[2] | In Color Layer[3] | In Colored Coating Syrup[4] | Standard Coating Syrup[5] |
|---|---|---|---|---|---|---|---|
| FORMULA D (Dark green) | | | | | | | |
| Lutein | 0.0312% | 1% | 0.0003% | 0.00120% | 0.0040% | 0.0028% | 0.0008% |
| Brilliant Blue | 0.0023% | 85% | 0.0019% | 0.00747% | 0.0249% | 0.0174% | 0.0052% |
| Lutein + Blue | | | 0.0023% | 0.0087% | 0.0289% | 0.0202% | 0.0061% |
| Lutein + Blue (ppm) | | | 23 | 87 | 289 | 202 | 61 |

[1]Weight % based on total product weight.
[2]Weight % based on total coating weight (30% of product weight is coating).
[3]Weight % based on weight of colored coating (30% by weight of total coating is colored).
[4]Weight % based on weight of solids in colored coating syrup (70% Solids in colored coating syrup).
[5]Weight % based on weight of solids in standard colored coating syrup (100% of colored coating)

For each of test products A-D, the coating color was also characterized by Pantone number and CIELAB, as shown in Table 6 below.

TABLE 6

Color Parameters for Test Products A-D.

| | Low Color (Test Products A & C) | High Color (Test Products B & D) |
|---|---|---|
| Pantone No. | 337 | 340 |
| L* | 82 | 51 |
| a* | −25 | −73 |
| b* | 1 | 13 |

Figure 3:
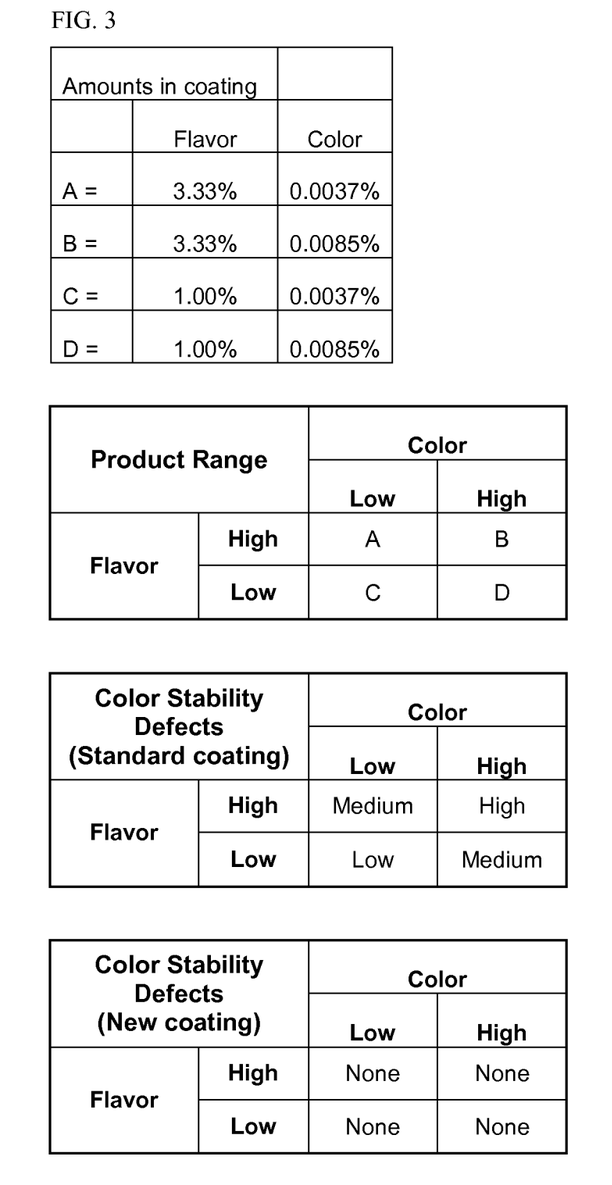
FIG. 3 presents tables summarizing the matrix of flavor and color concentrations in the completed coating for test products A-D (upper panel), the level of color stability defects detected for test products A-D manufacture with the standard coating process (middle panel), and the level of color stability defects detected for test products A-D manufacture with the coating process disclosed herein (bottom panel).
Figure 4:
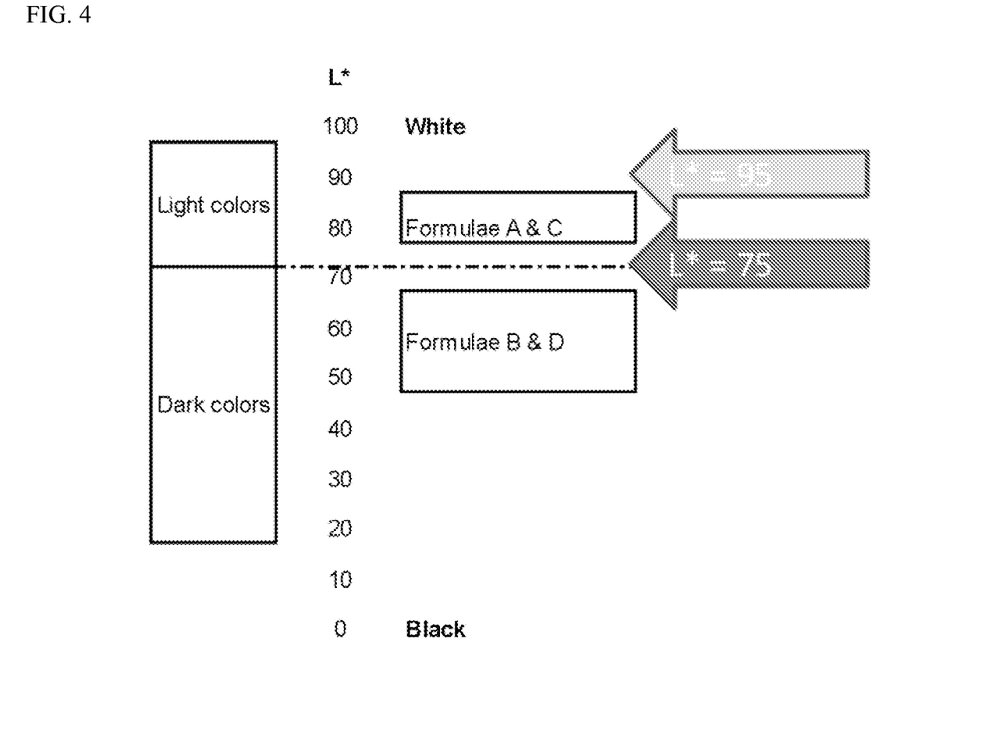
FIG. 4 is a schematic diagram showing CIELAB L* values for the coated products tested.

Color stability defects were determined for each of the test products after storage under accelerated aging conditions (37° C./80%), and are summarized in the middle and bottom panels of FIG. 3. For the products with flavor and color applied with the standard coating process, the level of color stability defects increased with increasing flavor and increasing color in the coating (FIG. 3, panel). For the products with flavor and color applied with the new coating process in which flavor and color were spatially separated, increasing flavor and increasing color in the coating did not produce color stability defects (FIG. 3, bottom panel).

Example 4

Shelf Life Test

The Formula B (high color, high flavor) prototype coated chewing gum products of Example 3, made with the new process, were compared with a coated gum product having the same flavor and color amounts made with the standard coating process including color throughout the coating ("100% colored coating").

Figure 2:
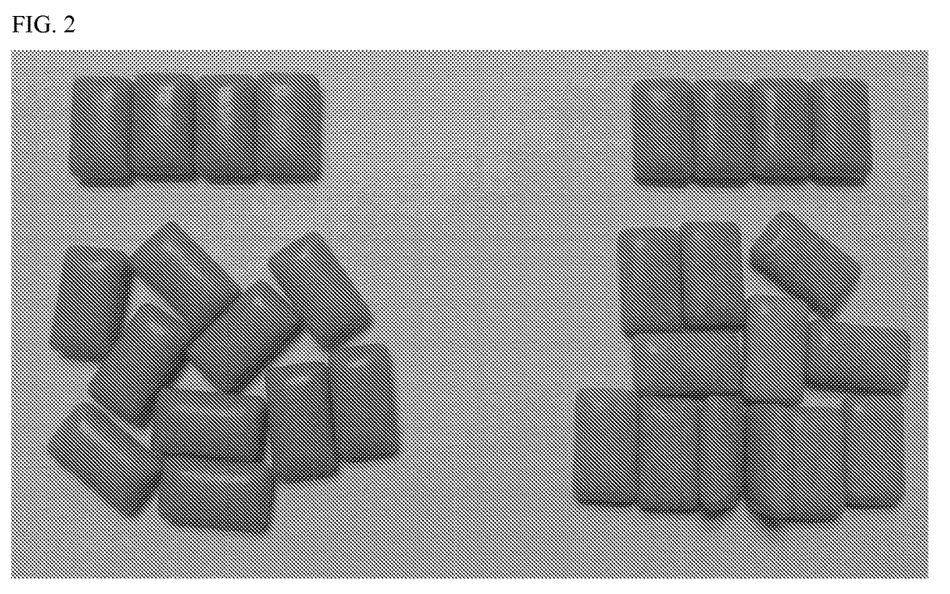
FIG. 2 is a photograph depicting a direct comparison between samples of exemplary coated chewing gum products (left) made with the claimed method and standard coated chewing gum products (right) with color throughout the coating at day 16 at 37° C./80% relative humidity (RH). The line of 4 pellets above each side is a control in which those coated chewing gum products were stored in the sample room at 25° C./65% RH.

Samples produced with the new coating method and samples produced with the "standard" coating method (100% colored coating) were placed under accelerated conditions 30° C./80% relative humidity (RH). FIG. 2 depicts a direct comparison of appearance of these two samples.

The samples made using the new coating process (FIG. 2, left) show no significant changes at day 16 of aging under accelerated conditions.

On the other hand, the samples made using the standard coating process showed signs of discoloration after day 2 of aging. Furthermore, at day 16 they presented a very significant discoloration. These pellets (FIG. 2, right) have a blue-marbled appearance and show signs of color instability (yellowing).

The colored coated edible products containing a high level of liquid flavors in the coating and the methods of making thereof disclosed herein include at least the following embodiments:

Embodiment 1. A hard coated edible product having reduced appearance defects, comprising: an edible core having a colored coating, the coating comprising about 15% to about 50% by weight of the hard coated edible product, wherein the coating color is characterized by a CIELAB L*<95, and flavorant and colorant are substantially spatially separated in the coating.

Embodiment 2. The hard coated edible product of embodiment 1, wherein the coating color is characterized by a CIELAB L*<85.

Embodiment 3. The hard coated edible product of embodiment 1 or embodiment 2, wherein the coating color is characterized by a CIELAB L*<75.

Embodiment 4. The hard coated edible product of any one of embodiments 1 to 3, wherein the colorant comprises a carotenoid, a curcuminoid, riboflavin, a derivative of any of the foregoing, or a combination of the foregoing.

Embodiment 5. The hard coated edible product of any one of embodiments 1 to 4, wherein the colorant comprises a carotenoid or a derivative thereof.

Embodiment 6. The hard coated edible product of any one of embodiments 1 to 5, wherein the flavorant is present in a coating layer in which a colorant comprising a carotenoid, a curcuminoid, riboflavin, a derivative of any of the foregoing, or a combination of the foregoing, is absent.

Embodiment 7. The hard coated edible product of any one of embodiments 1 to 6, wherein the color is present in a coating layer in which flavorant is absent, wherein the colorant comprises a carotenoid, a curcuminoid, riboflavin, a derivative of any of the foregoing, or a combination of the foregoing.

Embodiment 8. The hard coated edible product of any one of embodiments 1 to 7, wherein the edible core is a chewing gum, a confectionery, a nut, or a dried fruit.

Embodiment 9. The hard coated edible product of any one of embodiments 1 to 8, wherein the edible core is a chewing gum.

Embodiment 10. The hard coated edible product of embodiment 8, wherein the confectionery is a caramel, a chewy candy, a chocolate, a fondant, a fudge, a gummy, a hard candy, a licorice, a low boiled candy, a nougat, a pastille, a pressed mint, and the like, or a combination thereof.

Embodiment 11. The hard coated edible product of any one of embodiments 1 to 10, wherein the coating comprises about 25% to about 35% by weight of the hard coated edible product.

Embodiment 12. A hard coated edible product having reduced appearance defects, comprising: an edible core having a coating comprising at least two coating layers, an inner flavor layer comprising flavorant and a dried first coating syrup, the first coating syrup comprising no more than 0.0004 wt % of a colorant comprising a carotenoid, a curcuminoid, riboflavin, a derivative of any of the foregoing, or a combination of the foregoing, wherein the weight percent is by weight of the coating syrup; and an outer color layer comprising a colorant comprising a carotenoid, a curcuminoid, riboflavin, a derivative of any of the foregoing, or a combination of the foregoing and no more than 0.5 wt % flavorant, wherein the weight percent is by weight of the outer color layer, the coating comprising about 15% to about 50% by weight of the hard coated edible product.

Embodiment 13. The hard coated edible product of embodiment 12, wherein the first coating syrup comprises no colorant comprising a carotenoid, a curcuminoid, riboflavin, a derivative of any of the foregoing, or a combination of the foregoing.

Embodiment 14. The hard coated edible product of embodiment 12 or 13, wherein the outer color layer comprises no flavorant.

Embodiment 15. The hard coated edible product of any one of embodiments 12 to 14, wherein the edible core is a chewing gum, a confectionery, a nut, or a dried fruit.

Embodiment 16. The hard coated edible product of embodiment 15, wherein the edible core is a chewing gum.

Embodiment 17. The hard coated edible product of embodiment 15, wherein the confectionery is a caramel, a chewy candy, a chocolate, a fondant, a fudge, a gummy, a hard candy, a licorice, a low boiled candy, a nougat, a pastille, a pressed mint, and the like, or a combination thereof.

Embodiment 18. The hard coated edible product of any one of embodiments 12 to 17, wherein the coating comprises about 25% to about 35% by weight of the hard coated edible product.

Embodiment 19. The hard coated edible product of any one of embodiments 12 to 18, wherein the colorant comprises a carotenoid or a derivative thereof.

Embodiment 20. The hard coated edible product of any one of embodiments 12 to 19, the coating further comprising a base layer coating the edible core and under the inner flavor layer, the base layer comprising no colorant comprising a carotenoid, a curcuminoid, riboflavin, a derivative of any of the foregoing, or a combination of the foregoing and no flavorant.

Embodiment 21. The hard coated edible product of any one of embodiments 12 to 20, the coating further comprising a barrier layer over the inner flavor layer and under the outer color layer, the barrier layer comprising no colorant comprising a carotenoid, a curcuminoid, riboflavin, a derivative of any of the foregoing, or a combination of the foregoing and no flavorant.

Embodiment 22. The hard coated edible product of any one of embodiments 12 to 21, wherein the coating color is characterized by a CIELAB L*<95.

Embodiment 23. The hard coated edible product of any one of embodiments 12 to 22, wherein the coating color is characterized by a CIELAB L*<85.

Embodiment 24. The hard coated edible product of any one of embodiments 12 to 23, wherein the coating color is characterized by a CIELAB L*<75.

Embodiment 25. The hard coated edible product of any one of embodiments 1 to 24, wherein the first or second coating syrup further comprises a saccharide, a polyol, or a combination thereof.

Embodiment 26. The hard coated edible product of embodiment 25, wherein the saccharide, polyol, or combination thereof is present in an amount of about 60 to about 75 wt % of the total weight of the coating.

Embodiment 27. The hard coated edible product of any one of embodiments 25 to 26, wherein the coating comprises a polyol.

Embodiment 28. The hard coated edible product of any one of embodiments 25 to 27, wherein the polyol comprises xylitol, mannitol, maltitol, hydrogenated isomaltulose (ISOMALT), erythritol, or a combination thereof.

Embodiment 29. A method of making a hard coated edible product, comprising applying a first coating syrup and flavorant to a surface of an edible core to obtain a flavored coating layer, wherein the flavored coating layer is about 10% to about 95%, by weight of the total coating on the hard coated edible product and wherein the first coating syrup comprises no more than 0.0004 wt % of a colorant comprising a carotenoid, a curcuminoid, riboflavin, a derivative of any of the foregoing, or a combination of the foregoing; and applying a second coating syrup to the flavored coating layer to obtain a colored coating layer, wherein the colored coating layer is about 5% to about 50%, by weight of the total coating on the hard coated edible product, and wherein the colored coating layer comprises a colorant comprising a carotenoid, a curcuminoid, riboflavin, a derivative of any of the foregoing, or a combination of the foregoing, and no more than 0.5 wt % of a flavorant by weight of the colored coating layer, wherein the edible core is about 50% to about 75% by weight of the hard coated edible product.

Embodiment 30. The method of embodiment 29, further comprising prior to the application of the first coating syrup and flavorant: applying a base coating syrup to the surface of the edible core to obtain a base layer, wherein the base coating syrup comprises no colorant comprising a carotenoid, a curcuminoid, riboflavin, a derivative of any of the foregoing, or a combination of the foregoing and no flavorant; wherein the base layer is about 25% to about 65%, by weight of the total coating on the hard coated edible product.

Embodiment 31. The method of embodiment 29 or 30, further comprising, prior to applying the second coating syrup: applying a base coating syrup to the surface of the flavor-coated core to obtain a barrier coating layer, wherein the base coating syrup comprises no colorant comprising a carotenoid, a curcuminoid, riboflavin, a derivative of any of the foregoing, or a combination of the foregoing and no flavorant; wherein the barrier coating layer is about 2% to about 8%, by weight of the total coating on the hard coated edible product.

Embodiment 32. The method of any one of embodiments 29 to 31, wherein the coating color is characterized by a CIELAB L*<95.

Embodiment 33. The method of any one of embodiments 29 to 31, wherein the coating color is characterized by a CIELAB L*<85.

Embodiment 34. The method of any one of embodiments 29 to 31, wherein the coating color is characterized by a CIELAB L*<75.

Embodiment 35. The method of any one of embodiments 29 to 34, wherein the edible core is a chewing gum, a confectionery, a nut, or a dried fruit.

Embodiment 36. The method of embodiment 35, wherein the edible core is a chewing gum.

Embodiment 37. The method of embodiment 35, wherein the confectionery is a caramel, a chewy candy, a chocolate, a fondant, a fudge, a gummy, a hard candy, a licorice, a low boiled candy, a nougat, a pastille, a pressed mint, and the like, or a combination thereof.

Embodiment 38. The method of any one of embodiments 29 to 37, wherein the base coating syrup, the first coating syrup, or the second coating syrup further comprises a saccharide, a polyol, or a combination thereof.

Embodiment 39. The method of embodiment 38, wherein the saccharide, polyol, or combination thereof is present in an amount of about 60 to about 75 wt % of the total weight of the coating syrup.

Embodiment 40. The method of any one of embodiments 38 to 39, wherein the base coating syrup, the first coating syrup, or the second coating syrup further comprises a polyol.

Embodiment 41. The method of any one of embodiments 38 to 40, wherein the polyol comprises xylitol, mannitol, maltitol, hydrogenated isomaltulose (ISOMALT), erythritol, or a combination thereof.

Embodiment 42. The hard coated edible product of any one of embodiments 1 to 11, wherein substantially spatially separating flavorant and colorant in the coating comprises having a layer with flavorant having no more than 1% of the total amount of colorant in the coating, and a colored layer having no more than 1% of the total amount of flavorant in the coating.

Embodiment 43. The hard coated edible product of any one of embodiments 1 to 11 and 42, wherein flavorant and colorant are completely spatially separated in the coating.

Embodiment 44. The hard coated edible product of any one of embodiments 1 to 11, 22 to 28, and 43, wherein a*<0.

Embodiment 45. The hard coated edible product of any one of embodiments 1 to 11, 22 to 28, and 44, wherein a*<0 and b*>0.

Embodiment 46. The method of any one of embodiments 32 to 41, wherein a*<0.

Embodiment 47. The method of any one of embodiments 32 to 41 and 46, wherein a*<0 and b*>0.

The terms "a" and "an" do not denote a limitation of quantity, but rather denote the presence of at least one of the referenced item. The term "or" means "and/or". The terms "comprising", "having", "including", and "containing" are to be construed as open-ended terms (i.e., meaning "including, but not limited to"). The modifier "about" used in connection with a quantity is inclusive of the stated value and has the meaning dictated by the context (e.g., includes the degree of error associated with measurement of the particular quantity). For example, "about" can mean within one or more standard deviations, or within ±30%, 20%, 10%, 5% of the stated value. The term "a combination thereof" is inclusive of two or more components of the list. The term "homogeneous" refers to a uniform blend of the components. The terms "first," "second," and the like, "primary," "secondary," and the like, as used herein do not denote any order, quantity, or importance, but rather are used to distinguish one element from another Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable.

Unless defined otherwise, technical and scientific terms used herein have the same meaning as is commonly understood by one of skill in the art to which this invention belongs.

All references are incorporated by reference herein.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A hard coated edible product, comprising:
   an edible core having a coating comprising at least two coating layers,
   an inner layer comprising 0.1 wt % to 15 wt % flavorant and a dried coating syrup, the inner layer comprising no carotenoid, curcuminoid, riboflavin, or a combination of the foregoing, wherein the weight percent is by weight of the inner layer; and
   an outer layer comprising a colorant comprising a carotenoid, a curcuminoid, riboflavin, or a combination of the foregoing and no flavorant,
   the coating comprising about 15% to about 50% by weight of the hard coated edible product.

2. The hard coated edible product of claim 1, wherein the edible core is a chewing gum, a confectionery, a nut, or a dried fruit.

3. The hard coated edible product of claim 2, wherein the edible core is a chewing gum.

4. The hard coated edible product of claim 2, wherein confectionery is a caramel, a chewy candy, a chocolate, a fondant, a fudge, a gummy, a hard candy, a licorice, a low boiled candy, a nougat, a pastille, a pressed mint, and the like, or a combination thereof.

5. The hard coated edible product of claim 1, wherein the coating comprises about 25% to about 35% by weight of the hard coated edible product.

6. The hard coated edible product of claim 1, the coating further comprising a base layer coating the edible core and under the inner layer, the base layer comprising no carotenoid, curcuminoid, riboflavin, or a combination of the foregoing and no flavorant.

7. The hard coated edible product of claim 1, the coating further comprising a barrier layer over the inner layer and under the outer layer, the barrier layer comprising no carotenoid, curcuminoid, riboflavin, or a combination of the foregoing and no flavorant.

8. The hard coated edible product of claim 1, wherein the coating color is characterized by a CIELAB L*<95, determined relative to CIE standard illuminant D50.

9. The hard coated edible product of claim 1, wherein the coating color is characterized by a CIELAB L*<75, determined relative to CIE standard illuminant D50.

10. The hard coated edible product of claim 9, wherein CIELAB a*<0; or CIELAB a*<0 and CIELAB b*>0.

11. The hard coated edible product of claim 1, wherein the inner layer comprises 1 wt % to 6 wt % flavorant.

12. The hard coated edible product of claim 1, wherein storage of the hard coated edible product at 37° C. and 80% relative humidity for 16 days produces no coating appearance defects.

13. The hard coated edible product of claim 1, wherein the colorant comprises a carotenoid.

14. A method of making a hard coated edible product, comprising
applying a first coating syrup and flavorant to a surface of an edible core to obtain a flavored coating layer comprising 0.1 to 15 wt % flavorant and no carotenoid, curcuminoid, riboflavin, or a combination of the foregoing,
wherein the flavored coating layer is about 10% to about 95%, by weight of the total coating on the hard coated edible product; and
applying a second coating syrup to the flavored coating layer to obtain a colored coating layer,
wherein the colored coating layer is about 5% to about 50%, by weight of the total coating on the hard coated edible product, and wherein the colored coating layer comprises a colorant comprising a carotenoid, a curcuminoid, riboflavin, or a combination of the foregoing, and no flavorant,
wherein the edible core is about 50% to about 75% by weight of the hard coated edible product.

15. The method of claim 14, further comprising prior to the application of the first coating syrup and flavorant:
applying a base coating syrup to the surface of the edible core to obtain a base layer, wherein the base coating syrup comprises no carotenoid, curcuminoid, riboflavin, or a combination of the foregoing and no flavorant;
wherein the base layer is about 25% to about 65%, by weight of the total coating on the hard coated edible product.

16. The method of claim 14, further comprising, prior to applying the second coating syrup:
applying a base coating syrup to the surface of the flavored coating layer to obtain a barrier coating layer, wherein the base coating syrup comprises no carotenoid, curcuminoid, riboflavin, or a combination of the foregoing and no flavorant;
wherein the barrier coating layer is about 2% to about 8%, by weight of the total coating on the hard coated edible product.

17. The method of claim 14 wherein the coating color is characterized by a CIELAB L*<95, a CIELAB L*<85, or a CIELAB L*<75, determined relative to CIE standard illuminant D50.

18. The method of claim 17, wherein CIELAB a*<0; or CIELAB a*<0 and CIELAB b*>0.

19. The method of claim 14, wherein the edible core is a chewing gum, a confectionery, a nut, or a dried fruit.

20. The method of claim 19, wherein the edible core is a chewing gum.

21. The method of claim 14, wherein the first coating syrup or the second coating syrup further comprises a saccharide, a polyol, or a combination thereof.

22. The method of claim 21, wherein the saccharide, polyol, or combination thereof is present in an amount of about 60 to about 75 wt % of the total weight of the coating syrup.

23. The method of claim 21, wherein the first coating syrup or the second coating syrup further comprises a polyol.

24. The method of claim 21, wherein the polyol comprises xylitol, mannitol, maltitol, hydrogenated isomaltulose (ISOMALT), erythritol, or a combination thereof.

* * * * *